(12) United States Patent
Bedrosian

(10) Patent No.: US 11,902,016 B2
(45) Date of Patent: Feb. 13, 2024

(54) RANGING BETWEEN UNSYNCHRONIZED COMMUNICATION TERMINALS

(71) Applicant: MITRE Corporation, McLean, VA (US)

(72) Inventor: P. Stephan Bedrosian, McLean, VA (US)

(73) Assignee: MITRE Corporation, McLean, VA (US)

( * ) Notice: Subject to any disclaimer, the term of this patent is extended or adjusted under 35 U.S.C. 154(b) by 0 days.

(21) Appl. No.: 17/538,146

(22) Filed: Nov. 30, 2021

(65) Prior Publication Data

US 2023/0171013 A1 Jun. 1, 2023

(51) Int. Cl.
*H04W 56/00* (2009.01)
*H04J 3/06* (2006.01)
*H04L 43/0864* (2022.01)

(52) U.S. Cl.
CPC ........ *H04J 3/0661* (2013.01); *H04L 43/0864* (2013.01); *H04W 56/0065* (2013.01)

(58) Field of Classification Search
CPC ....... H04L 63/0869; H04L 69/18; H04L 9/30; H04W 12/033; H04W 12/06; H04W 12/63; H04W 4/023; H04W 4/026; H04W 4/12; H04W 4/80; H04W 8/183
USPC .......................................................... 370/350
See application file for complete search history.

(56) References Cited

U.S. PATENT DOCUMENTS

| | | | | |
|---|---|---|---|---|
| 10,397,738 | B2* | 8/2019 | Roberts | H04L 43/0864 |
| 2011/0255523 | A1* | 10/2011 | Barcel? Arroyo | H04W 64/00 370/338 |
| 2017/0261591 | A1* | 9/2017 | Zhang | G01S 5/12 |
| 2017/0280439 | A1* | 9/2017 | Zhang | H04L 5/0055 |
| 2018/0288730 | A1* | 10/2018 | Küchler | H04W 4/029 |
| 2020/0015038 | A1* | 1/2020 | Burugupalli | H04W 4/023 |
| 2020/0106877 | A1* | 4/2020 | Ledvina | H04W 12/06 |
| 2021/0006915 | A1* | 1/2021 | Hegde | H04N 21/43615 |
| 2022/0039058 | A1* | 2/2022 | Raj | H04W 64/00 |

* cited by examiner

*Primary Examiner* — Robert J Lopata
(74) *Attorney, Agent, or Firm* — Jones Day

(57) ABSTRACT

A range is determined between two unsynchronized communications terminals in which a first terminal transmits a range request to a second terminal. The first terminal stores a first timestamp in memory corresponding to a time at which the range request message was transmitted. A range response is later received by the first terminal from the second terminal. The range response includes a residence time that characterizes an amount of time the second terminal required to send the range response after receiving the range request. The first terminal later stores a second timestamp in memory corresponding to a time at which the range response was received. Based on the second timestamp minus the first timestamp and the residence time, a roundtrip time for the range request is calculated. This roundtrip time can be used to calculate a distance between the first terminal and the second terminal based on the roundtrip time.

18 Claims, 6 Drawing Sheets

RANGING BETWEEN UNSYNCHRONIZED COMMUNICATION TERMINALS

GOVERNMENT LICENSE RIGHTS

This invention was made with government support under FA8702-22-C-0001 awarded by the U.S. Department of Defense. The government has certain rights in the invention.

TECHNICAL FIELD

The subject matter described herein relates to techniques which use time measurements to compute the distance between two unsynchronized communication terminals over a line-of-sight channel.

BACKGROUND

Distance information between communication terminals, such as satellites, can be used for a variety of purposes to enhance data exchange between such terminals. For example, power of transmissions can be adjusted based on distance (sometimes referred to range) in order to reach a desired bit error rate.

SUMMARY

In a first aspect, a range is determined between two unsynchronized terminals in which a first terminal transmits a range request to a second terminal. The first terminal stores a first timestamp in memory corresponding to a time at which the range request message was transmitted. A range response is later received by the first terminal from the second terminal. The range response includes a residence time that characterizes an amount of time the second terminal required to send the range response after receiving the range request. The first terminal later stores a second timestamp in memory corresponding to a time at which the range response was received. Based on the second timestamp minus the first timestamp and the residence time, a roundtrip time for the range request is calculated. This roundtrip time can be used to calculate a distance between the first terminal and the second terminal based on the roundtrip time.

The distance can be calculated by multiplying half of the calculated roundtrip time by the speed of light.

The calculated distance can be used or otherwise consumed by various processes and/or applications. In one variation, one or more communication parameters on the first terminal are adjusted based on the calculated range.

The first terminal can communicate with the second terminal over a line of sight communication channel.

The timestamps can be generated on a physical layer of a communications protocol.

A header of the range request message can include a range request flag. In some variations, the second terminal can queue the range response for immediate transmission to the first terminal or otherwise prioritize the transmission of the range response and subsequently transmit such range response.

In some variations, the first terminal sends a message prior to the range request that includes a range request flag. In response to the receipt of such message, the second terminal queues the range response for immediate transmission and/or prioritized transmission to the first terminal and later transmits the range response to the first terminal.

Relative motion can be calculated between the first and second terminals. Using this calculate relative motion, a correction to the calculated range is applied based on the relative motion.

The first and second terminals can comprise varying devices with communications interfaces including satellites.

Non-transitory computer program products (i.e., physically embodied computer program products) are also described that store instructions, which when executed by one or more data processors of one or more computing systems, cause at least one data processor to perform operations herein. Similarly, terminals are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for determining distance between communication terminals which, in turn, can be used to improve aspects such as quality of service, bit error rate, and the like. In particular, the current subject matter can provide accurate ranging measurements over a full-duplex communication channel without the need for either terminal to be synchronized with each other. In addition, no extra equipment is needed to perform the range measurement unlike conventional ranging systems utilizing a retroreflector. Still further, the current techniques also provide for ranging measurements over greater distances as compared to conventional systems. The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
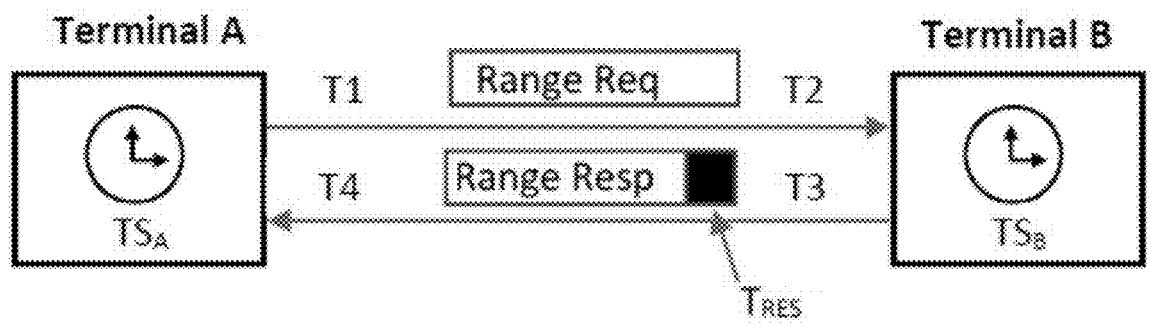
FIG. 1 is a first schematic diagram illustrating data exchange between two communications terminals.

The current subject matter provides enhanced techniques that use time measurements to compute the distance between two unsynchronized communication terminals (i.e., compute the range) over a line-of-sight channel.

As will be described in further detail below, instead of using pulsed laser light between two terminals, a range request message is transmitted by the near terminal over the communication channel that is also carrying other data traffic. Rather than using a retroreflector to generate a return signal, the far terminal sends a range response message to the near terminal containing the measured time between receiving the range request message and transmitting the range response message. This measured time value is also referred to herein as the residence time. Once the near terminal receives the range response message, it is then able to compute the range by subtracting the received residence time from the time interval between sending the range response message and receiving the range request message. If both terminals need to measure the range between each other, they can either share the range measurement over the communication channel, or independently perform range measurements using this messaging technique.

As noted above, no additional hardware is needed for terminals to perform the range measurement. Unlike the conventional ranging approach, the optical communication channel of some terminals already supports a pointing, acquisition and tracking process (PAT) to acquire optical communication signals between each terminal. In addition, in some variations, the intensity of the laser light received by either terminal is much greater than the light returned by the retroreflector. Therefore, the current system can operate over a longer range than conventional ranging systems.

If the measured value of residence time was not exchanged in this messaging process, the near terminal would not be able to compute the range based on the round-trip time measurement alone. Unlike the instantaneous reflection used by systems with retroreflectors, the time needed for the far terminal to process a range request message is significant. Therefore, the current techniques use the residence time to measure the actual processing time at the far terminal so it can be subtracted from the round-trip time measurement process computed by the near terminal.

Hardware timestamping pertains to detecting and measuring when a first packet of a message has been transmitted/received (e.g., at the physical layer) and assigning a timestamp to such message. One protocol for generating timestamping referred to as precision time protocol (PTP) is provided in IEEE 1588. The accuracy of this process will affect overall measurement accuracy and should occur as close to the network interface/connection point as possible. For example, if an optical physical layer is used, the timestamping point should be as close to the O/E (optical to electrical) or E/O (electro to optical) point as possible.

Timestamp generation is based on recording the instant that a specific event occurs based on the "current" value of a local timing domain (i.e., the local clock value). For example, the receipt of a specific message would trigger the generation of a timestamp.

Time measurement is a process of computing the difference between successive timestamps or summing individual time differences to yield a measured value.

Timestamp exchange is a process that involves writing a local timestamp to an outgoing message that is sent over a network and then recovering an additional timestamp from an incoming message received over a network.

The Precision Time Protocol (PTP) residence time measurement technique returns a delay response-type message to a delay request query. This is modified herein to measure range based on the difference between timestamps. To reduce range measurement errors, the current approach assumes (i) hardware timestamping at the physical layer, (ii) line of sight transmission between terminals, and (iii) a local free-running clock at each terminal of known stability.

FIG. 1 is a diagram 100 that illustrates signaling between two Terminal A and Terminal B that are in communication with each other over a line of sight transmission channel. With this arrangement, two timing domains (e.g., clocks at at each terminal) are not synchronized but operate in a plesiochronous state.

Timestamps $T_1$ and $T_4$ are based on the TSA timing domain (i.e., the clock of Terminal A) and timestamps $T_2$ and $T_3$ are based on the $TS_B$ timing domain (i.e., the clock of Terminal B). The accuracy of each timing domain is defined as the fractional frequency offset (FFO) compared with coordinated universal time (UTC). For example, the accuracy of TSA is equal to $FFO_A$ and the accuracy of $TS_B$ is equal to $FFO_B$.

Referring still to FIG. 1, the following describes the exchange of timestamps between the two terminals (Terminal A and Terminal B) to determine the range between them. Terminal A sends a Range Request (Range Req) message to Terminal B. The time that the Range Request message was transmitted (egress timestamp) is $T_1$ and this value is held by Terminal A for future processing.

Terminal B receives Range Request message at time $T_2$ (ingress timestamp) and holds this time value for future processing.

Terminal B responds to Range Request message by sending Range Response (Range Resp) message at $T_3$ (egress timestamp) containing the association with the Range Request message as well as the residence time (i.e., the amount of time Terminal B takes to send the Range Response after receiving the Range Request). The residence time is computed by the equation: $T_{RES}=T_3-T_2$. It should be noted that the $TS_B$ timing domain is used to establish the values of $T_3$ and $T_2$. That is, the clock of Terminal B can be used to establish the values of $T_3$ and $T_2$. In some variations, the residence time $T_{RES}$ can be written to the outgoing Range Response. In other variations, a Range Response follow-up message can be sent that includes the residence time $T_{RES}$.

Terminal A receives a Range Response message at time $T_4$ and associates the receipt of this message with the transmission of Range Request message.

Terminal A next computes the round-trip time $T_{RT}$ based on $T_1$, $T_4$ and $T_{RES}$. The round-trip time $T_{RT}$ can be computed as follows: $T_{RT}=T_4-T_1-T_{RES}$.

Terminal A next computes the one-way path delay $T_{OW}$ to Terminal B which can be calculated as $T_{OW}=0.5*T_{RT}$.

Once the one-way path delay is computed, the range (in meters) can be calculated by multiplying the one-way delay by the speed of light:

$$R_{AB}=T_{OW}*c \text{ Where } c=299{,}792{,}458 \text{ m/s.}$$

This one-way time measurement method is an adaptation of the PTP delay request/response mechanism as well as the residence time computation. This method assumes a symmetric path delay between the two terminals and is subject to a measurement error $M_{TE}$ equal to the residence time multiplied by the FFO between the two terminals.

$$M_{TE}=T_{RES}*(FFO_A+FFO_B)$$

Based on the above equation, the Mm can be minimized by reducing the residence time interval or decreasing the differential FFO between the two terminals. Several approaches can be taken to reduce the residence time including increasing the physical layer bit/symbol rate or prioritizing the processing and transmission of STATE A messages.

The residence time can, in some cases, result in measurement errors and, as such, techniques can be applied to minimize residence time measurement error. One way to minimize the residence time can be to create a unique "ranging" message and rules for processing such a message upon receipt. Per the message exchange in FIG. 1, a ranging request message (State A) can be sent from the requesting terminal (Terminal A) at ($T_1$) to the destination terminal (Terminal B). Once Terminal B receives the range request message at $T_2$, it will prepare a range response message and schedule the transmission of the message with high priority. The time that terminal (B) received the range request message until the time it sends the range response message is the residence time ($T_3-T_2$).

The residence time measurement error is based on the fractional frequency difference of the clocks in Terminals A and B. For example, if there were a fractional frequency difference of 40 ppm and a data rate of 622 Mbps, the minimum expected time measurement error for a given set of processing rules can be computed as follows:

Symbol period=1.60772 ns
Range Request Packet size=64 B
Residence Time at Terminal B=640 B=9.0546 μs
Expected timestamp error $M_{TE}$=0.363 ns With the above, the expected timestamp error is calculated by multiplying the residence time at Terminal B by the fractional frequency difference of 40 ppm (i.e., the $FFO_A$+ $FFO_B$).

If it is assumed that the data travels between the two terminals at the speed of light, the expected position error caused by this timestamp error would be $M_{TE}$*c=0.108 meters. If the residence time at Terminal B is reduced to 64B or 1.646e-6 sec, the expected position error drops to 0.0197 meters. Therefore, processing rules local to the terminals can be implemented to minimize the time Terminal B needs to process a range response message in order to minimize the residence time.

There are several approaches that can be taken to minimize the residence time for a given data rate as provided below.

In a first variation, a special range request flag can be incorporated into the header of the range request message. Upon receipt by Terminal B, the range response message will be sent to the output queue for transmission back to Terminal A. To minimize residence time, a range request follow-up message can be sent immediately after the range request message containing the actual time the range request message was sent (T3).

In a second variation, a special range request enable flag can be incorporated into the message preceding the transmission of the range request packet. This method would prepare Terminal B for receipt of the range request message and subsequent transmission of the range response message. Such preparation can include the formation of a range response message in Terminal B's transmission buffer. Upon receipt of the range request header, Terminal B can start to transmit the range response message. This approach allows residence times to be less than the length of the range request packet.

The first variation relies on Terminal B being able to read packet headers on-the-fly and perform a real-time classification. However, this functionality may not be possible with all packet RX buffers. Some buffers require the entire packet to be read into a buffer before any classification or processing can commence. Additionally, this scheme does not provide for the proactive management of transmit buffers to accommodate the rapid transmission of a range response message. For example, if several packets are scheduled to be transmitted when the range request packet is received, these packets must be transmitted first before the range request packet can be transmitted. This will cause an increase in residence time and loss of range resolution.

The second variation takes a proactive approach for allowing configuration of both the receive and transmit buffers at Terminal B. Since the packet preceding the range request packet provides notification that a range measurement handshake is about to occur, it allows Terminal B to maximize its processing resources and reduce its residence time. In addition, the TX buffer scheduler can now be proactively configured to accommodate a range response message including the formation of this message before the receipt of the range request message. This technique will result in lower overall residence times than the first variation.

Both of these methods could be implemented as a one or two-step method where the range response follow-up message is transmitted in addition to the range response message.

Figure 2:
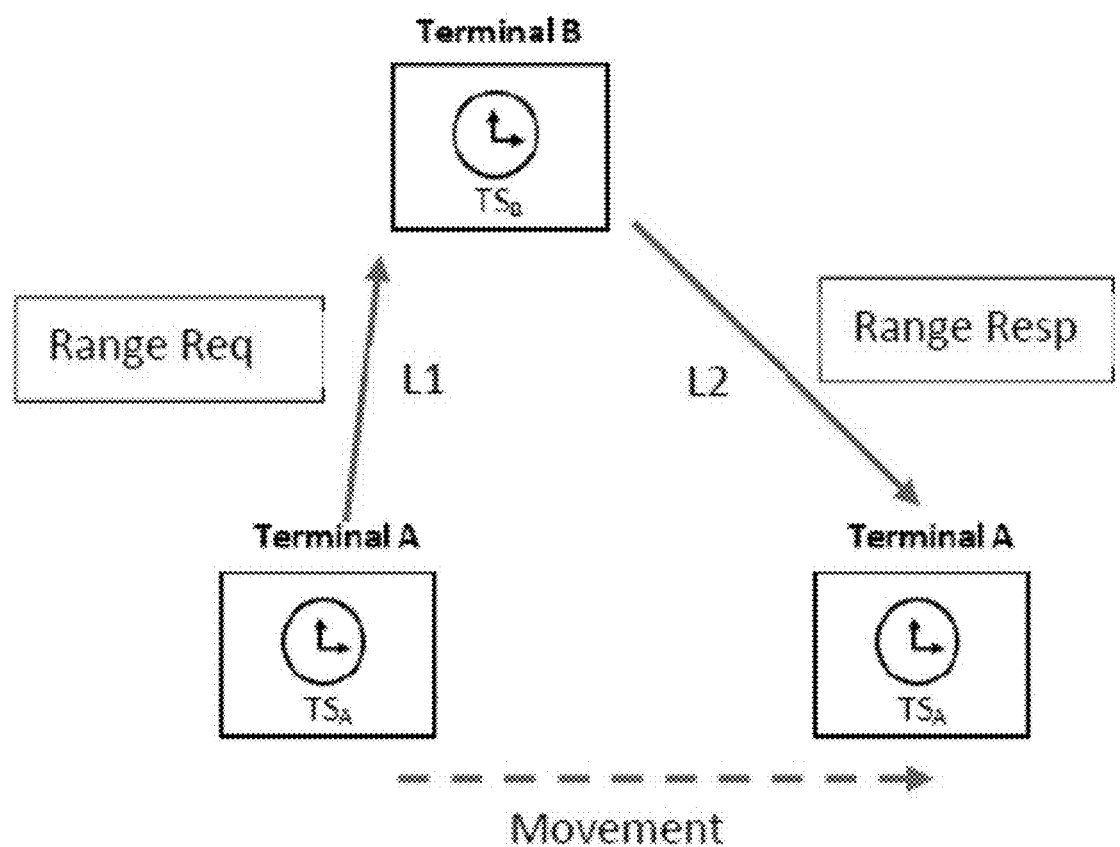
FIG. 2 is a second schematic diagram illustrating data exchange between two communications terminals.

Delay asymmetry can be taken into account as the forward and reverse propagation delays may not be equal. This asymmetry can be due to the independent movement between the two terminals that changes the distances that the Range Request message and the Range Response messages must respectively travel (L1 and L2) such as illustrated in diagram 200 of FIG. 2.

When a Range Request message is transmitted from Terminal A to Terminal B, the line of site (LoS) distance is L1. When Terminal B transmits Range Response message to Terminal A, the LoS distance is L2. This difference in LoS distance is due to the movement of Terminal A with relation to Terminal B. As a result, the computed distance will be the mean distance of L1+L2.

Figure 3:
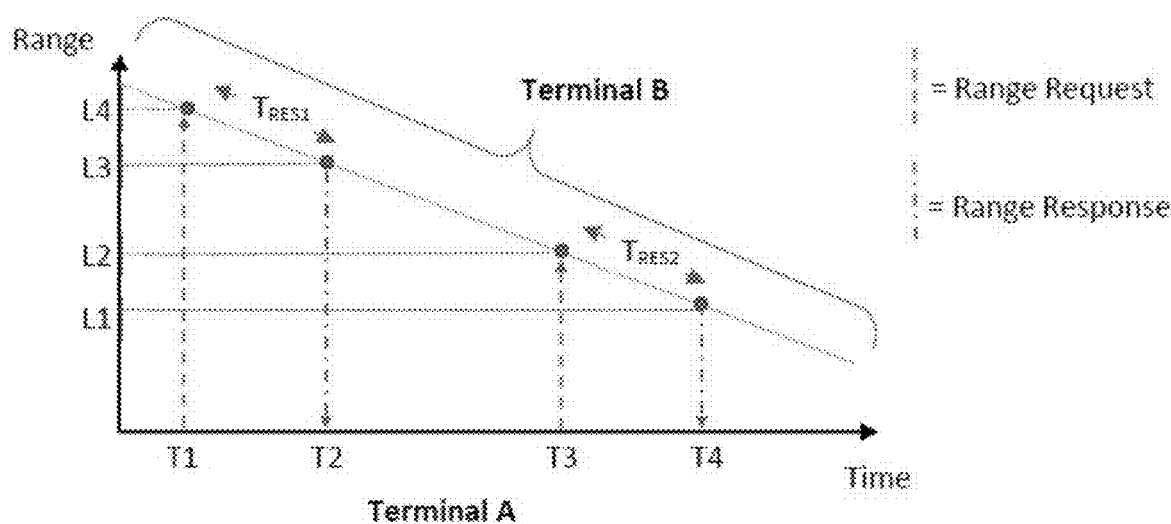
FIG. 3 is a diagram illustrating range request/response message passing for Doppler correction.

There are several methods that can be used to correct the one-way delay measurement if the terminals are moving with respect to each other. For example, a Doppler measurement, characterizing the motion between the two terminals, can be used to provide a feed-forward correction $T_{FF}$ to the $T_{OW}$ measurement. Doppler corrections can be made to the ranging process and be based on a series of one-way delay measurements between two terminals. FIG. 3 is a diagram 300 that illustrates where such measurements are taken between two terminals and how they are applied to the ranging process. Note that in this example, the range between these two terminals is assumed to change linearly over time. In addition, this example represents the initial exchange of messages between the two terminals without prior knowledge of range or Doppler measurements.

At time $T_1$, Terminal A sends a Range Request message to Terminal B. After the Range Request message propagates over distance L4, it is received by Terminal B. After a residence time of $T_{RES1}$, Terminal B transmits a corresponding Range Response message to Terminal A. After the Range Response message propagates a distance L3, it is received by Terminal A. After receipt of the Range Response message, Terminal A can compute the range to Terminal B based on the following equations:

$$R_{AB}=T_{OW}*c \text{ Where:} c=299{,}792{,}458 \text{ m/s},$$

$$T_{OW}=0.5 \times T_{RT}$$

$$T_{RT}=T_4-T_1-T_{RES}.$$

As this measurement is the initial range measurement by Terminal A to Terminal B, Terminal A has no prior knowledge of any Doppler effect between the two terminals and will therefore assume that the range to Terminal B between time $T_1$ and $T_2$ is static. The resulting range computation will represent the mean range value between times $T_1$ and $T_2$. Therefore, the computed range of this initial measurement will be: $R_{AB1}=0.5\times(L4+L3)$. Ideally, the range should have been equal to L3 since this was the actual distance between Terminals A and B at Time $T_2$. Therefore, the initial range measurement will have a measurement error ($R_{ME}$) equal to $R_{ME}=0.5\times(L4-L31)$.

The next set of measurements between Terminals A and B are made starting at time $T_3$. Like before, a Range Request message is issued by Terminal A and a Range Response message is issued by Terminal B after a residence time of $T_{RES2}$. The difference between this range measurement and the one prior is that the Range Request message propagated over distance L2, and the Range Response propagated over a distance L1, between Terminals A and B. Therefore, applying the previous set of range equations, the range for the second measurement will be equal to: $R_{AB2}=0.5\times(L2+L1)$.

However, since there are two sets or of range measurements, a computation of the Doppler effect can now be made. The Doppler effect can be calculated by computing the difference in range divided by the time interval between the two measurements. The equation for computing the Doppler effect is:

$$D_{E1}=(R_{AB1}-R_{AB2})/(T_4-T_2)$$

Once the Doppler effect is known, it may be applied to correct the values of the previous range measurement:

For range measurement 2, the corrected range measurement is:

$$RC_{AB2}=R_{AB2}-D_{E2}\times(T_2-T_1)$$

In order to maintain the accuracy of the corrected range measurement, the Doppler effect can be continually measured through a periodic sequence of range measurements. These range measurements can be performed exclusively by a single terminal (as shown in the previous example) or performed independently by each terminal and shared with its neighbor through a separate messaging channel. For example, if Terminal A performs a sequence of n Doppler effect measurements $D_{AE}(n)$, it can share these measurements (i.e., transmit data characterizing these measurements) with Terminal B where Terminal B could use these time-correlated measurements to compute its corrected range to Terminal A. Likewise, if Terminal B performs a sequence of p Doppler effect measurements $D_{BE}(p)$, it can share these measurements with Terminal A where Terminal A could use these time-correlated measurements to compute its corrected range to Terminal B.

If both Terminals A and B are independently computing the Doppler effect between each other and sharing these measurements ($D_{AE}(n)$ and $D_{BE}(n)$), they can use these time-sequenced Doppler effect measurements to predict how the Doppler effect will change. In the example above, a linear change in range was assumed. However, the range between two terminals may not change linearly and can result in a corrected range error if the Doppler effect is computed using range measurement samples spaced over large time interval relative to the motion of the terminals. The process of sharing Doppler effect measurements between terminals will be referred to as the collaborative Doppler Effect measurement process.

Figure 4:
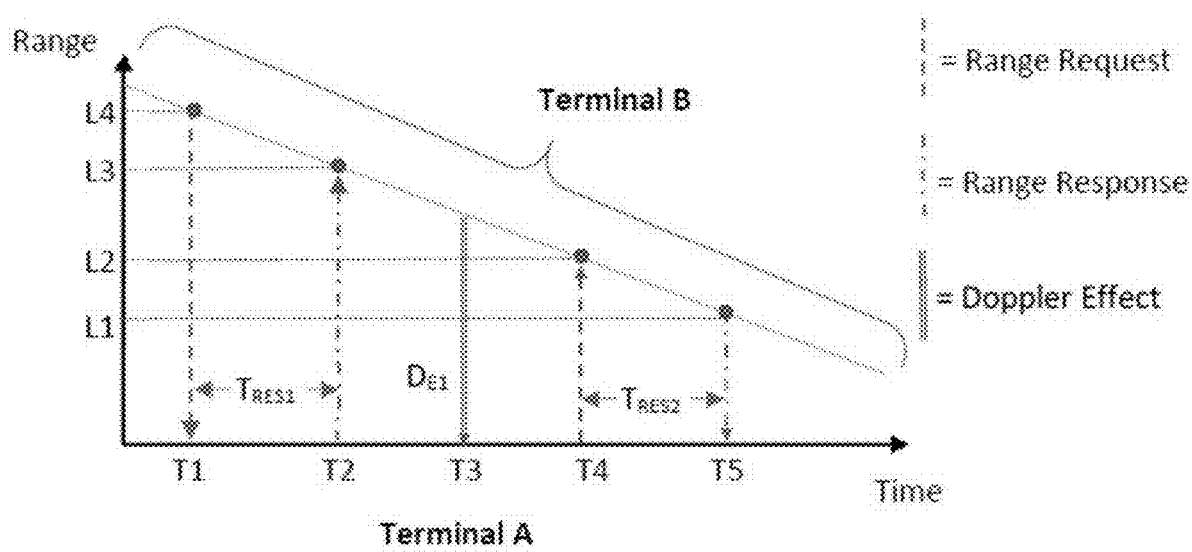
FIG. 4 is a diagram illustrating collaborative Doppler correction messaging.

FIG. 4 is a diagram 400 that illustrates how the collaborative Doppler correction messaging can be used to improve the range measurement process. A Range Request message is issued by Terminal B at time $T_1$, and a Range Response message containing the value of $T_{RES1}$ is received by Terminal B at time $T_2$. Terminal B then computes the associated Doppler Effect $D_{E1}$ and corrected Range Measurement. For this example, it can be assumed that Terminal B has completed at least one previous Range Measurement with Terminal A prior to T1. The value of $D_{E1}$ along with the time value T2 is then sent from Terminal B to Terminal A in a separate message and arrives at Terminal A at Time T3. Upon receipt of the message containing $D_{E1}$, Terminal A saves this value along with the time value T2 for use in a future corrected range measurement. At time T4, Terminal A issues a Range Request message to Terminal B and at time T5, Terminal A receives the Range Response message containing the value of $T_{RES2}$. Since the value of $D_{E1}$ received from Terminal B is the most current value of Doppler Effect available, Terminal A uses the value of $D_{E1}$ to compute the corrected range measurement at time T5. If the value of $D_{E1}$ had not been received by Terminal A, either a previous value of $D_E$ would be used to compute the corrected range value or if no previous value of $D_E$ was available, the "uncorrected" range value can be computed instead.

Figure 5:
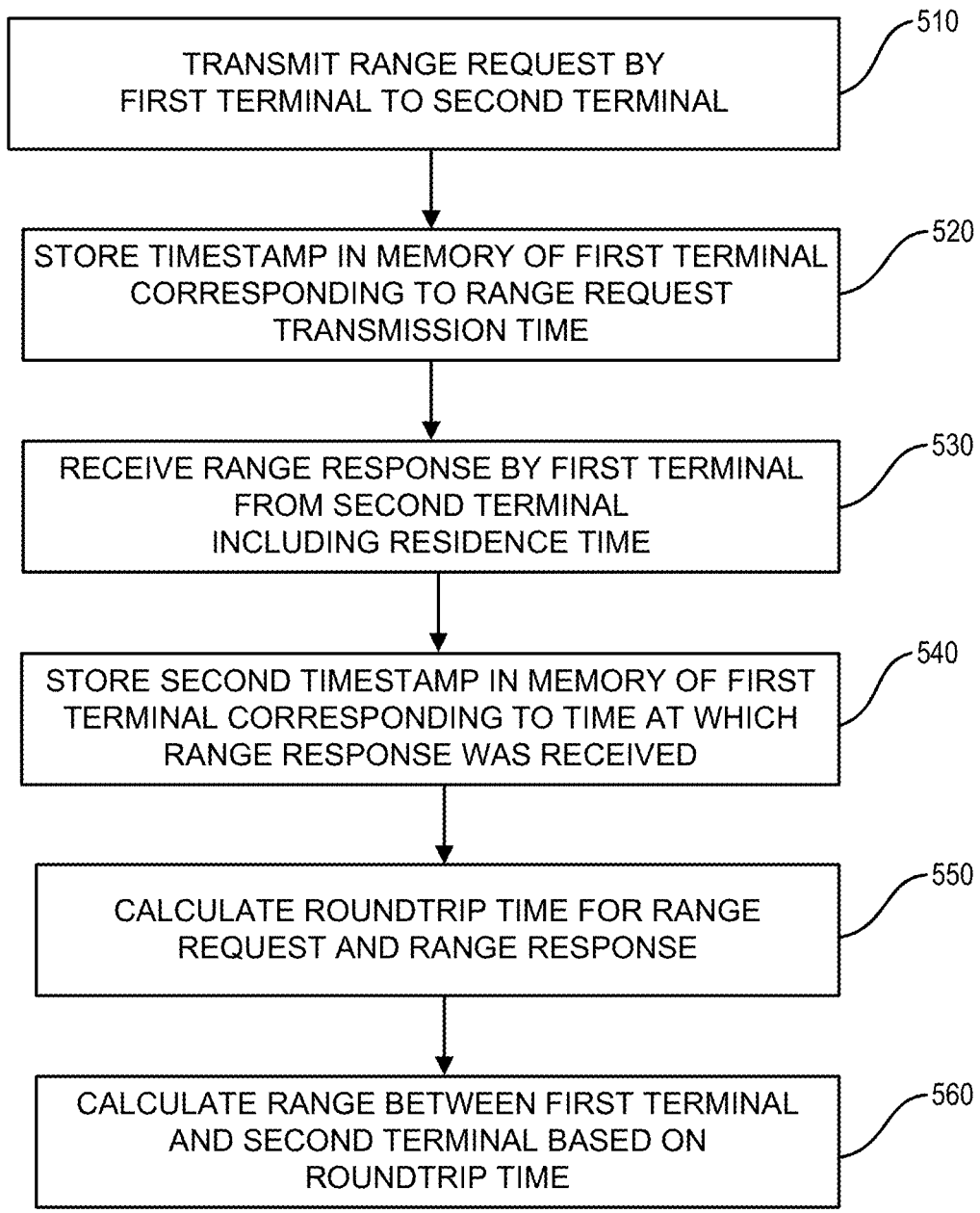
FIG. 5 is a process flow diagram for ranging between unsynchronized communication terminals.

FIG. 5 is a process flow diagram 500 for determining a range between two unsynchronized communications terminals in which, at 510, a first terminal transmits a range request to a second terminal. The first terminal, at 520, stores a first timestamp in memory corresponding to a time at which the range request message was transmitted. A range response is received, at 530, by the first terminal from the second terminal. The range response includes a residence time that characterizes an amount of time the second terminal required to send the range response after receiving the range request. The first terminal later, at 540, stores a second timestamp in memory corresponding to a time at which the range response was received. Based on the second timestamp minus the first timestamp and the residence time, at 550, a roundtrip time for the range request is calculated. This roundtrip time can be used, at 560, to calculate a distance between the first terminal and the second terminal based on the roundtrip time.

Figure 6:
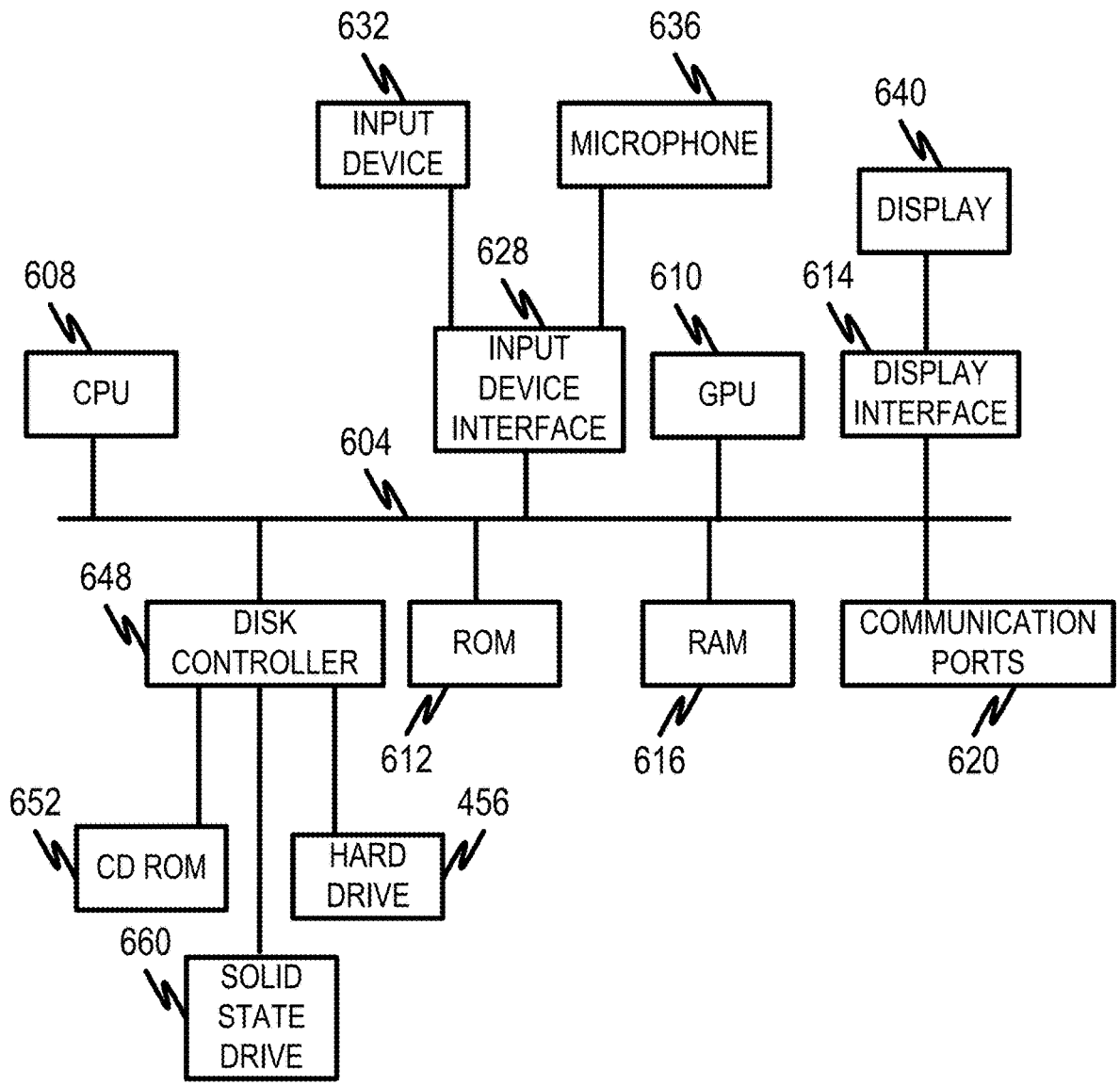
FIG. 6 is a diagram illustrating aspects of a computing device for implementing aspects of the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. In addition, a processing system 610 labeled GPU (graphics processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as a keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628. Certain of the components in FIG. 6 can be omitted when such computing device is one of Terminal A or Terminal B (e.g., display interface 614, input devices, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for determining a range between two unsynchronized communications terminals comprising:
   transmitting, by a first terminal, a range request to a second terminal over a line of sight channel, wherein the first and second terminals are independently in motion with respect to each other and have unsynchronized timing domains, wherein the terminals are satellites;
   storing, by the first terminal, a first timestamp in memory corresponding to a time at which the range request message was transmitted;

receiving, by the first terminal from the second terminal, a range response to the range request, the range response including a residence time that characterizes an amount of time the second terminal required to send the range response after receiving the range request;

storing, by the first terminal, a second timestamp in memory corresponding to a time at which the range response was received;

calculating a roundtrip time for the range request and range response based on the second timestamp minus the first timestamp and the residence time;

calculating a distance between the first terminal and the second terminal based on the roundtrip time;

repeatedly measuring a doppler effect through a periodic sequence of range measurements; and using the doppler effect measurements to compute a corrected range.

2. The method of claim 1, wherein the first and second terminals communicate over an optical communications channel.

3. The method of claim 1 further comprising:
adjusting one or more communication parameters on the first terminal based on the calculated range.

4. The method of claim 1, wherein the first terminal and second terminal are satellites that communicate with each other over a line of sight communication channel.

5. The method of claim 1, wherein the timestamps are generated on a physical layer of a communications protocol.

6. The method of claim 1, wherein a header of the range request message comprises a range request flag and the method further comprises:
queueing, by the second terminal, the range response for immediate transmission to the first terminal; and
transmitting, by the second terminal, the range response to the first terminal.

7. The method of claim 1, wherein a header of the range request message comprises a range request flag, and the method further comprises:
prioritizing, by the second terminal, the range response for transmission to the first terminal in relation to other messages to queued for transmission in the second terminal; and
transmitting, by the second terminal, the range response to the first terminal.

8. The method of claim 1 further comprising:
sending a message prior to the range request comprising a range request flag;
queueing, by the second terminal after receiving the range request and in response to the range request flag, the range response for immediate transmission to the first terminal; and
transmitting, by the second terminal, the range response to the first terminal.

9. The method of claim 1 further comprising:
sending a message prior to the range request comprising a range request flag;
prioritizing, by the second terminal after receiving the range request and in response to the range request flag, the range response for transmission to the first terminal; and
transmitting, by the second terminal, the range response to the first terminal.

10. The method of claim 1 further comprising:
calculating relative motion between the first and second terminals; and
applying a correction to the calculated range based on the relative motion, wherein the correction is made by obtaining two sets of range measurements and computing the difference in range divided by the time interval between the two measurements.

11. A system for determining a range between two unsynchronized communications terminals comprising:
at least one data processor; and
memory comprising instructions which, when executed by the at least one data processor, result in operations comprising:
transmitting, by a first terminal, a range request to a second terminal over a line-of-sight communications channel, wherein the first and second terminals are independently in motion with respect to each other and have unsynchronized timing domains, wherein the terminals are satellites;

storing, by the first terminal, a first timestamp in memory corresponding to a time at which the range request message was transmitted;

receiving, by the first terminal from the second terminal, a range response to the range request, the range response including a residence time that characterizes an amount of time the second terminal required to send the range response after receiving the range request;

storing, by the first terminal, a second timestamp in memory corresponding to a time at which the range response was received;

calculating a roundtrip time for the range request and range response based on the second timestamp minus the first timestamp and the residence time;

calculating a distance between the first terminal and the second terminal based on the roundtrip time;

repeatedly measuring a doppler effect through a periodic sequence of range measurements; and using the doppler effect measurements to compute a corrected range.

12. The system of claim 11, wherein the first and second terminals communicate over an optical communications channel.

13. The system of claim 11, wherein the operations further comprise:
adjusting one or more communication parameters on the first terminal based on the calculated range.

14. The system of claim 11, wherein the timestamps are generated on a physical layer of a communications protocol.

15. The system of claim 11, wherein a header of the range request message comprises a range request flag and the method further comprises:
queueing or prioritizing, by the second terminal, the range response for transmission to the first terminal; and
transmitting, by the second terminal, the range response to the first terminal.

16. The system of claim 11, wherein the operations further comprise:
sending a message prior to the range request comprising a range request flag;
queueing or prioritizing, by the second terminal after receiving the range request and in response to the range request flag, the range response for transmission to the first terminal; and
transmitting, by the second terminal, the range response to the first terminal.

17. The system of claim 11, wherein the operations further comprise:
calculating relative motion between the first and second terminals; and applying a correction to the calculated range based on the relative motion, wherein the correction is made by obtaining two sets of range measurements and computing the difference in range divided by the time interval between the two measurements.

18. A system comprising:
a first communications terminal in communication with
a second communications terminal over a line-of-sight communications channel, wherein the first and second communications terminals are independently in motion with respect to each other and have unsynchronized timing domains, and the terminals are satellites;
wherein the first communications terminal:
  transmits a range request to the second terminal;
  stores a first timestamp in memory corresponding to a time at which the range request message was transmitted;
  receives, from the second communications terminal, a range response to the range request, the range response including a residence time that characterizes an amount of time the second communications terminal required to send the range response after receiving the range request;
  stores a second timestamp in memory corresponding to a time at which the range response was received;
  calculates a roundtrip time for the range request and range response based on the second timestamp minus the first timestamp and the residence time; and
  calculates a distance between the first communications terminal and the second communications terminal based on the roundtrip time;
  repeatedly measures a doppler effect through a periodic sequence of range measurements; and
  uses the doppler effect measurements to compute a corrected range.

\* \* \* \* \*